March 2, 1971 M. A. VOLOSHEN ET AL 3,566,585

GREASE-EXTRACTING APPARATUS

Filed July 7, 1969

INVENTORS,
MONA A. VOLOSHEN,
DANNY B. DEAVER;

*Calvin Brown*
ATTORNEY

United States Patent Office 3,566,585
Patented Mar. 2, 1971

3,566,585
GREASE-EXTRACTING APPARATUS
Mona A. Voloshen, 600 South St. 91202, and Danny B. Deaver, 1541 E. Colorado Blvd. 92015, both of Glendale, Calif.
Filed July 7, 1969, Ser. No. 847,483
Int. Cl. B01d 45/06
U.S. Cl. 55—435                               2 Claims

ABSTRACT OF THE DISCLOSURE

The filter of the invention has two frames in adjustable telescopic relationship to control the volume of air flow therethrough. Each frame carries an aligned row of spaced apart baffle members with the row of one frame in staggered or offset relationship with the row of the other frame, whereby hot organic laden air drawn through the filter circulates between the rows in a devious path in its passage to a vent duct. The baffle members are coated with a non-adherent material such as a fluorocarbon resin, whereby the hot organic material which normally would adhere to the baffle members will drip or flow therefrom under gravity into a trough for disposal.

BACKGROUND OF THE INVENTION

Field of the invention

The invention is particularly adaptable for use in restaurants having large grills or broilers with a canopy overlying the same and holding filters of the character of the present invention. The filters of the invention differ from ordinary filters which are generally of hydrated siliceous material in that the present invention depends upon the use of baffle members arranged in separate rows and in adjustable staggered relationship. The baffle members are of metal coated with a fluorocarbon resin such as a tetrafluoroethylene-polymer, or a tetrafluoroethylene-hexafluoropropylene copolymer to provide on the baffle members a smooth surface with a slippery feel and which are characterized by low coefficient of friction with the result that the organic material in the hot gases from the grill or broiler due to a cooking operation do not adhere to the baffle members but flow or drop therefrom into a trough carried by the canopy. Hence cleaning of the filter or filters is easily accomplished by removing the filters from the hood or canopy and washing the same in hot water. Thus a minimum of time is expended by a workman in the cleaning of the filters and the replacement thereof, in the canopy or hood.

SUMMARY

If the area above the grill or broiler is of extended length, separate filter units are utilized, each unit being identical in construction and positioned in the hood or canopy directly above the food being cooked on the grill or broiler. Each filter unit includes two frame members in telescopic relationship and each frame interiorly carries transverse rows of baffle members of transverse channel section. The legs or sides of said channel type baffle members in one row carried by a first framing spacedly straddle the legs of the second row of channel baffle members secured to a second frame, and means is provided for adjusting the degree of telescoping of the frames. The baffle members are protected from abrasion by expanded type grids carried by the frames. The organic laden hot air is transversely drawn through the filter and in its passage the air assumes a devious path between the rows of channel sectioned baffle members. The organic matter does not adhere to the baffle members but is immediately deposited in a drip trough and carried away from the heated area above the grill or broiler with the result that the likelihood of fire is remote.

DESCRIPTION OF THE PREFERRED EMBODIMENT

Figure 1:
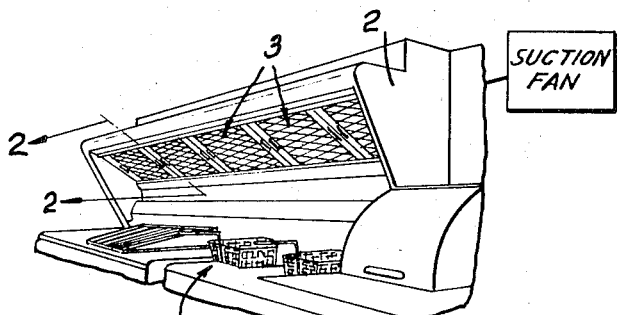
FIG. 1 is a fragmentary perspective view of a grill and broiler and a canopy positioned above the grill and broiler, which canopy carries filters of the present invention.

Referring to the drawing, FIG. 1 illustrates a form of grill and broiler 1 having the usual burners with a hood or canopy designated generally as 2, positioned above the grill or broiler with a series of aligned filter members 3 carried by the hood or canopy and overlying the top of the grill and broiler. There is included in such a construction, only partly shown, a vent duct 3a leading from the canopy or hood to a blower or suction fan for moving the air from the grill or broiler through the filters into the vent duct and outwardly to the atmosphere. It may be pointed out that in the kitchens of large restaurants or cafes, during a cooking operation, there is a large amount of organic material such as grease carried in the air from the food. In order to prevent contamination and unsanitary conditions in the kitchen, it is essential that this organic material be removed. During the cooking of food, a flame flare-up often occurs, but the design of the present filter is such that the filter does not catch fire from such flame flare-up with the result that the flame is not conducted to the vent duct. The present invention is designed to effectively and efficiently remove organic material from the air rising from the grill and broiler.

Figure 3:
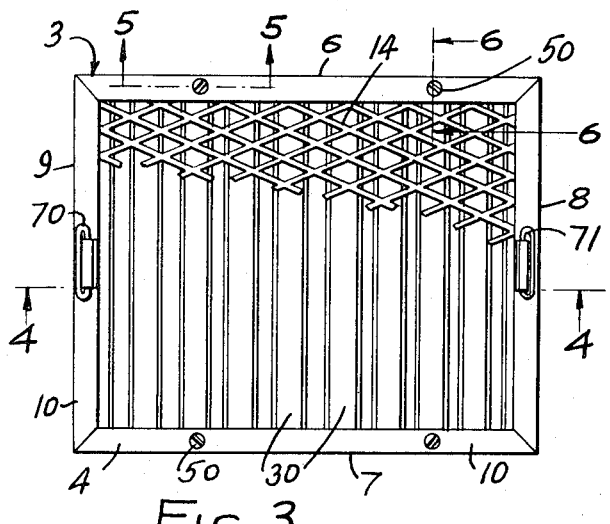
FIG. 3 is a fragmentary front elevation, on an enlarged scale, of a filter unit.
Figure 6:
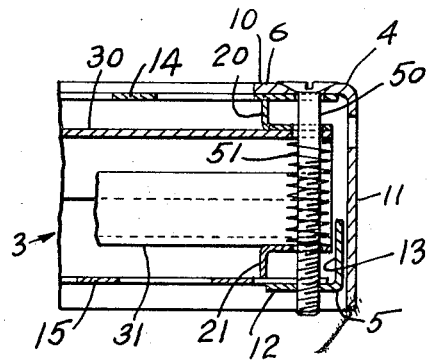
FIG. 6 is a fragmentary sectional view, on an enlarged scale, taken on the line 6—6 of FIG. 3; and, FIG. 7 is a transverse sectional view, on an enlarged scale, of one of the baffle members.
Figure 7:
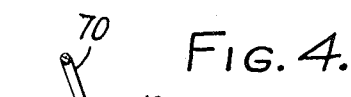
Figure 4:
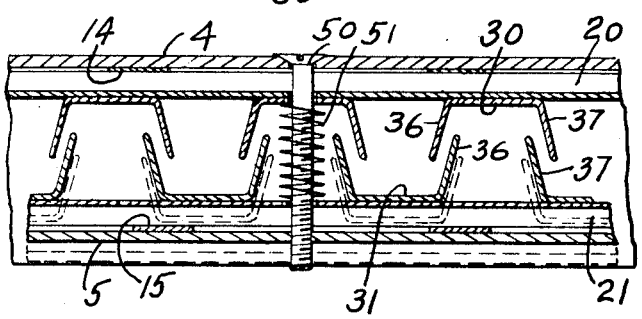
FIG. 4 is a sectional view, on an enlarged scale, taken on the line 4—4 of FIG. 3.
Figure 5:
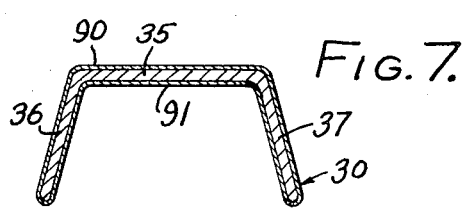
FIG. 5 is a fragmentary sectional view, on an enlarged scale, taken on the line 5—5 of FIG. 3.

There may be any number of filters 3 as illustrated in FIG. 1 arranged in end to end relationship lengthwise of the hood or canopy and reference is now made specifically to FIGS. 3 to 7 inclusive. FIG. 4, as an entirety, includes a pair of telescopic frames 4 and 5 and in the present instance each frame is substantially rectangular in form, the frame 4 having top and bottom members 6 and 7 which are parallel and end members 8 and 9 joined at the corners with the top and bottom members. The frame 5 is similarly constructed and each frame has angularly related top and side portions, as shown at 10 and 11 for the frame 4 and 12 and 13 for frame 5. Both frames 4 and 5 are shallow in depth. Metal grids 14 and 15 are carried inside the frames 4 and 5 respectively, being tack-welded to the frame sides 10 and 12 respectively. The grids in the present instance are shown as being of expanded metal form, although other forms may be employed. Each frame has secured within the same and movably bearing against the grids upper and lower angular bars 20 and 21 (FIG. 6). Frames 4 and 5, considered as entireties, are provided respectively with baffle members 30 and 31. One of the baffle members is illustrated in FIG. 7 and is of open channel type and substantially of isosceles trapezoidal section. Each baffle member, as shown, includes a base 35, sides or legs 36 and 37, at a base angle. The base angles may vary but in the present instance each base angle is approximately 105°. In other words, the sides diverge from the base. As shown in FIGS. 3 and 4, the baffle members extend transversely of each frame and the bases 35 are secured to the upper and lower angular bars 20 and 21. The grouping is such that the baffle members of each frame lie in parallel relationship and spaced apart, as shown for instance at 40 and 41. The sides or legs of the baffle members for each frame 4 and 5 are received within the channel portions of said baffle members with legs of the baffle members for one frame 4 paralleling the legs of the baffle members carried by the frame 5. The telescopic relationship between the frames 4 and 5 is adjustable to cause the sides of the baffle members to vary in degree of spaced overlap of the legs or sides of the channel portions of opposed baffle members. This adjustment is effected by the means shown in FIG. 6 wherein we have shown a screw 50 passed through the frame 4 and a leg of the angular bar 20, and a hole in the angular bar 21 for threaded engagement with the frame 5, there being a coil compression spring 51 surrounding the screw 50 and bearing at one end against the base of a baffle member and the opposite end bearing against the angular bar 21. In the present instance, four screws 50 are provided, as shown in FIG. 3 and a turning of the screws will either cause approach or separation of the sides of one set of baffle members carried by frame 4 and the other set carried by frame 5 as illustrated in FIG. 5. Thus sides or legs 36 and 37 of baffle member 30 spacedly overlap the legs 36 and 37 of two opposite baffle members 31 carried by frame 5 as the screws 50 are turned in one direction to narrow the space between said sides or legs of opposing baffle members or to enlarge said space, as indicated by the dotted line position for said baffle members in FIG. 5. This is important in the present invention as air passed through the filter transversely thereof will flow in the path indicated by the arrows 60 and 61, FIG. 4. This flow path is regulated by varying the spacing between adjacent sides of opposed baffle members. If the space between adjacent sides of opposed baffle members is termed a throat or channel, it is evident that such arrangement provides for venturi action in the flow of the air. Thus in the arrangement of FIG. 5 by solid lines, the flow of gasses would be decreased and the flow increased when the opposed baffle members are in the position shown by the dotted lines of FIG. 5. Hence the airflow over the grill or broiler is easily adjusted to any requirement desired, or as required by the building code. This adjustment allows an increase or decrease in static pressure within the filter. Ordinarily air is moved through the filters at approximately 375 to 450 feet per minute.

The frame 4 is provided with handles 70 and 71 which in the present instance are secured to members 8 and 9 in any approved manner, such as illustrated in FIG. 4.

Figure 2:
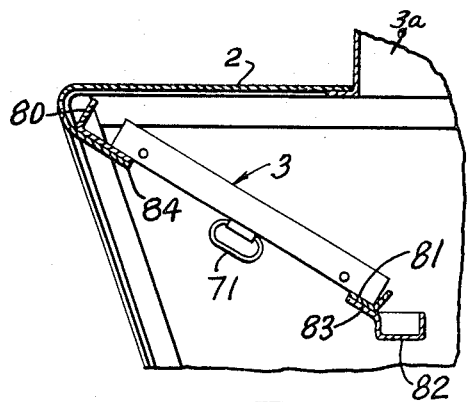
FIG. 2 is a fragmentary sectional view, on an enlarged scale, taken on the line 2—2 of FIG. 1.

The canopy 2 is provided with an angular top support 80 (FIG. 2) which runs the length of the canopy and with a parallel bottom support 81 also running the length of the canopy between ends thereof to which support is secured a drip trough 82 which extends from one end of the canopy to the opposite end at a downward slope. The lower support 81 has a short leg 83 and the top support a leg 84. The filter members are adapted to be carried between the top and bottom supports as illustrated in FIG. 2 and due to the difference in width of the legs 83 and 84 the filters are easily removed between said supports by moving a filter member upwardly on the upper support to release the lower portion thereof from the bottom support. It will be noted that the filter of the present invention does not utilize any granular material usually contained in a bag of some character for trapping grease in its passage through the filter. This filter has each baffle member coated with a fluorocarbon resin both internally and externally, as indicated in FIG. 7 at 90 and 91. The fluorocarbon resins may be a tetrafluoroethylene polymer or a tetrafluoroethylene-hexafluoropropylene polymer. This type of resin is known in the industry under various trade names such as Teflon, the registered trademark of E. I. du Pont de Nemours and Co. Fluorocarbon resins are substantially independent of fabrication conditions and have a low coefficient of friction, thus providing a smooth surface which is slippery to the touch. Thus air laden with the organic material such as grease in passing through the filter, and particularly in the deflected flow path indicated by the arrows 60–61 will have the grease or non-solidified material removed from said air by the baffle members and which organic material will not adhere to the coated fluorocarbon resin surfaces 90 and 91 with the result that such organic non-solidified material will flow from said surfaces into the drip trough 82. The organic material from the drip trough may be deposited in a bucket or other device for disposal. The metallic grids 14, 15 protect the treated surfaces of the baffle members as the baffle members are spaced from said grids by the angle bars 20 and 21. The grids protect the fluorocarbon resin surfaces against abrasion by any materials that might come in contact with said surfaces. It should be noted that the fluorocarbon resin coating is characterized in that it is resistant to high heat and as a consequence will not deteriorate under high heat conditions from the grill or broiler and as a consequence the coating never burns. Thus fluorocarbon resin coating of the baffle members may be accomplished in any of the well known methods now normally employed such as by dipping, spraying and other methods. Washing the filters is easy of accomplishment as the operator may clean the filters by use of hot water within a minimum of time.

It is to be noted that the coil springs 51 surrounding screws 50 urge the bars 20 and 21 into engagement against the grids 14 and 15, while holding the baffle members in position.

We claim:

1. Grease-extracting apparatus for large grills or broilers having canopies overlying the cooking areas comprising, in combination, a plurality of grease-extractor units arranged end to end and removably supported from such a canopy in a position inclined to the vertical, with their lower parts further inside the canopy than their upper parts; a drip trough supported from each canopy in a position to receive any grease flowing down from the inclined grease-extractor units, said drip trough having a downward slope so that grease dropping into it will flow down to a collecting device for disposal; each grease-extractor unit including a pair of rectangular frames which are shallow in depth, and have angularly related top and side portions all around, the side portion of one frame which is on the outside of the grease-extractor unit adjacent the cooking area telescopically receiving the side portion of the other frame which is on the inside; a perforated expanded metal grid fixed within and to each frame and permitting free passage of air therethrough; a pair of angular bars within each frame adjacent to but inside the respective grids, and movably bearing against the respective grids; a plurality of baffle members fixed to each pair of angular bars, extending at right angles to the same and equally spaced-apart; each baffle member being of open channel type with imperforate walls and being of substantially isosceles trapezoidal cross section with its base secured rigidly to an angular bar; the baffle members which are secured to one pair of angular bars being offset relative to the baffle members which are secured to the other pair of angular bars; the sides or legs of any two adjacent baffle members extending toward the channel portion of a single baffle member fixed to the two opposite angular bars; all of the surfaces of the baffle members being coated with a tetrafluoroethylene polymer or a tetrafluoroethylene-hexafluoropropylene polymer, thus providing smooth surfaces to which grease carried by air drawn through the apparatus will not adhere but will flow down from said surfaces into said drip trough; and a set of adjustment screws passed through the outer frame, having threaded engagement with the inner frame, and turnable from the outside of the grease-extractor unit to effect adjustment of the position of the inner frame member relative to the outer frame member, hence adjustment of the positions of the one set of baffle members relative to the set of baffle members fixed to the outer frame; the canopy having a vent duct conducting air passing through said grease-extractor units to a suction fan that blows cleaner air to the atmosphere.

2. The invention defined in claim 1, wherein a coil compression spring surrounds each adjustment screw and bears at one end against the base of a baffle member and bears at the other end against an angular bar; said coil springs urging the angular bars against the grids on opposite sides of the grease-extractor units.

References Cited

UNITED STATES PATENTS

| 722,272 | 3/1903 | Baker | 55—444X |
|---|---|---|---|
| 3,008,601 | 11/1961 | Cahne | 34—(AS) |
| 3,055,038 | 9/1962 | Black | 34—(AS) |
| 3,178,013 | 4/1965 | Hubbard | 209—366.5X |
| 3,217,629 | 11/1965 | Ekern | 98—115(K) |

FOREIGN PATENTS

| 869,507 | 11/1941 | France | 261—114JP |
|---|---|---|---|
| 1,150,603 | 6/1963 | Germany | 55—445 |

FRANK W. LUTTER, Primary Examiner

V. GIFFORD, Assistant Examiner

U.S. Cl. X.R.

55—443; 98—115